J. M. NEIL.
PROCESS OF FILTRATION.
APPLICATION FILED JAN. 26, 1912.
1,043,455.
Patented Nov. 5, 1912.
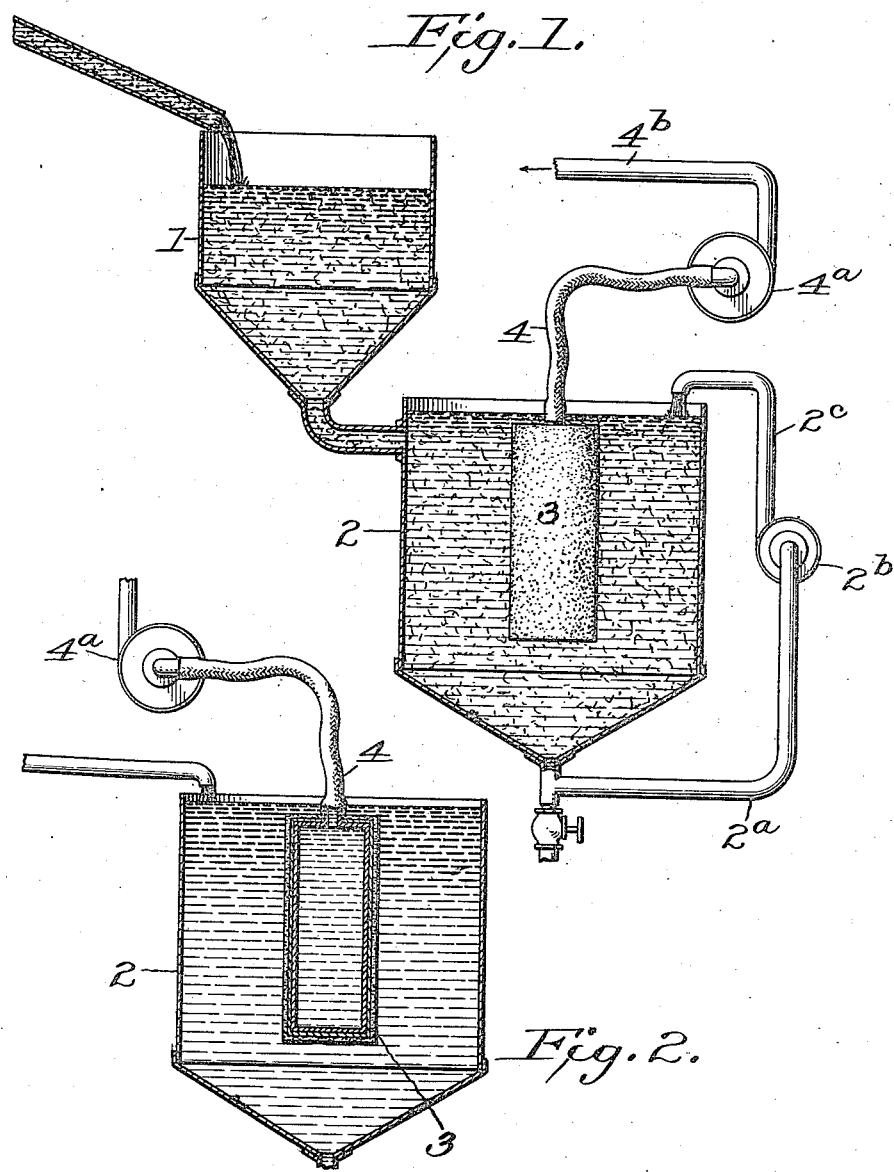

UNITED STATES PATENT OFFICE.

JAMES MILLAR NEIL, OF TORONTO, ONTARIO, CANADA.

PROCESS OF FILTRATION.

1,043,455.	Specification of Letters Patent.	Patented Nov. 5, 1912.

Application filed January 26, 1912. Serial No. 673,599.

*To all whom it may concern:*

Be it known that I, JAMES MILLAR NEIL, of Toronto, in the county of York, Province of Ontario, Dominion of Canada, have invented certain new and useful Improvements in Processes of Filtration; and I hereby declare that the following is a full, clear, and exact description thereof.

This invention is a novel improvement in methods of filtration, its object being to effect the separation of liquids from solids and solids from liquids more quickly, efficiently and economically than can be done by decantation or by the methods of filtration heretofore practiced.

The invention is particularly adapted for use in separating solutions containing precious metals from slimes in cyanidation processes; in separating solutions containing soda from wood pulp; in separating solutions containing alkali from caustic lime mud; and in many other arts in which decantation or filtration is or may be used for the separation and recovery of liquids from solids, or of solids from liquids.

The mixture to be separated—which consists of liquids and solids in suspension therein—may be introduced into a suitable tank, wherein it should be continually agitated, preferably by withdrawing it from the bottom of the tank and discharging it into the upper part thereof by a suitable pump and connections. The liquor is then separated from the suspended solids in the mixture in the tank, while in agitation; by passing the liquor through a separating medium covered with a filtering substance or cloth permeable by such liquid but impermeable to the solids, which latter collect on the face of such separating medium.

Preferably I employ a hollow filtering member, such for example as is shown and described in Patent No. 748,088 of December, 1903, or No. 955,660 of April 19, 1910, which will permit the clear liquid to pass, but will not permit the passage of the suspended solids. This separating medium should be completely submerged in the mixture being treated. The interior of said separating medium is connected to a suitable apparatus or pump adapted to create a suction inside of the separating medium; and draw the clear liquid through the permeable walls of the separating medium into the interior thereof, and discharge the liquid into any suitable receiver.

By reason of the suction in the separating medium particles of the solids suspended in the mixture will be drawn toward the separating medium and will adhere to and coat the outer sides thereof, and impede the drawing off of the clear liquid through the separating medium, and when such coating becomes so thick as to stop or retard the passage of the liquid through the separating medium it has heretofore been necessary to separate the medium from the mixture, and remove the coating from the separating medium; which cleansing operation results in great loss of time in the operation of the apparatus and a corresponding reduction in the output thereof. For example, in the treatment of slimes, etc. in the cyanide processes for the extraction of precious metals by the known vacuum filtering systems, in many instances the nature of the ores, minerals, etc., undergoing treatment make it impossible to obtain practically satisfactory and economical operating results as the cakes or layers form on the separating medium so rapidly that it has heretofore been necessary to frequently remove and cleanse the separating medium, whereby under existing practice the process of filtration is seriously interrupted and retarded. In order to avoid the necessity of such frequent separating and cleaning of the separating medium; and to enable the filtering operation to be continued indefinitely, I at intervals momentarily stop the suction and send a reverse current or pressure outwardly through the separating medium thereby throwing the deposits or coating on the separating medium back into the mixture while the separating medium remains submerged therein; and this reversal of current clears the separating medium and enables me to immediately resume the suction; and by intermitting the suction periods with throwoff periods I am enabled to withdraw the clear liquid from the mixture until the mixture in the tank becomes so thick that it is desirable to remove some of the solids therefrom.

In carrying out my invention the filtering operation is preferably performed as follows: To commence the process the mixture is preferably run into a tank and agitated, while the separating medium is submerged therein; then the clear liquor is drawn from the mixture in the tank through the separating medium until a coating of solids adheres to the medium sufficient to unduly retard the flow; then, momentarily, the drawing operation is stopped and a current of air or liquor forced back through the separating medium, thereby loosening or throwing off the coating thereon into the tank; then the suction is immediately resumed until another retarding coating has formed on the separating medium; then this coating is thrown off as above; and such suction and pressure operations may be repeated as often as may be desirable, and enable the process of filtration to be carried on almost continuously until it becomes desirable to remove some or all of the solids from the tank; and at the same time enables the mixture to be thickened to any desired consistency.

When used in cyaniding processes my invention greatly increases the efficiency of the apparatus in separating and removing the solution from the slimes and enables the separating operation to be carried on for longer periods than under existing methods, thereby increasing the daily capacity of the apparatus. It also facilitates the handling of materials which interfere with the efficiency of filtering operations as heretofore conducted. This novel method of operation when applied to the well known portable suction filter system enables greater quantities of solution to be handled through the submerged separating medium before removing it from the solution tank to the wash tank with the cake attached; or when applied to the well known stationary filter system before emptying the solution tank in order to render the same available as a wash tank.

My invention is particularly valuable in the treatment of slimes from which the solution has only been partially removed. Instead of retaining the cake on the separating medium by suction and washing same to recover further solution by drawing barren solution or water through it, (either in a separate wash tank as in the movable system, or in the tank from which the solution has been removed as in the stationary system), I may throw off the cake into the wash tank containing barren solution or water and thoroughly agitate the same, and then draw the barren solution or wash water through the separating medium thereby again forming a cake. These operations may be repeated as often as may be found necessary, in order to completely free the slimes from solution.

In the movable system of filtration two or more tanks may be used and the cake or layer formed on the separating medium may be periodically removed or carried over from tank to tank for more efficient washing; in such cases my invention enables the filtration process in the first or solution tank to be carried on indefinitely and practically without interruption, while the washing of the separated material by weak solution or water can be carried on independently in one or more separate tanks.

When used for example in the recovery of soda from caustic lime mud, my process eliminates the production of enormous volumes of weak liquors of varying strengths, such as are produced by the present known processes; which solutions have to be evaporated before they can be economically used; and necessitate the employment of large storage tanks, and large and expensive evaporating apparatus; and also enables the filtering process to be continued almost indefinitely between stoppages for cleaning the filter, as by my process the clear liquor is withdrawn of practically uniform strength, while the solids simply accumulate in the tank.

The accompanying drawings represent diagrammatically an apparatus which might be employed in the performance of my process.

In said drawings: Figure 1 is a conventional diagrammatic elevation of the filtration apparatus. Fig. 2 is a detail sectional view through one of the separating units.

In said drawings, 1 represents a tank into which the waste liquors or sewage may be discharged or collected from the works, and from which the liquid to be filtered can be discharged into a tank 2, wherein it may be continually agitated, for example by withdrawing it from the bottom of the tank through a pipe $2^a$ to a suitable pump $2^b$ and discharging it again into the upper part of the tank through a pipe $2^c$.

3 represents a hollow filtering member, (such for example as is shown and described in Patent No. 748,088 of December 29, 1903, or No. 955,660 of April 19, 1910) which will permit clear liquid to pass, but will not permit the passage of the suspended solids. This filtering member 3 should be completely submerged in the liquid in tank 2. The interior of this filtering member 3 is connected by a pipe 4 to an apparatus or pump $4^a$, adapted to create a suction inside of the filtering member 3, and draw the clear liquid through the permeable walls of the filtering member into the interior thereof, and thence through pipe 4 to pump $4^a$; from which it may be discharged through a pipe $4^b$ into any suitable receiver.

What I claim is:

1. The process of separating liquors from solid matters in suspension therein, consisting in passing the clear liquor through a separating medium submerged therein, thereby causing the suspended solids to adhere to said separating medium; then momentarily suspending the drawing operation and reversing the current through the separating medium to throw the adhering solids off said separating medium; and repeating such operations until it is desired to remove the solids.

2. The process of separating liquid from solid matters held in suspension therein, consisting in alternately passing the clear liquid through a separating medium submerged in the liquid to cause the suspended solids to adhere thereto, and then momentarily reversing the current through the separating medium to throw the solids off said medium, while the latter remains submerged.

3. The process of separating solid matters from liquids in a mixture thereof, consisting in immersing in the mixture a separating medium pervious to the liquid and impervious to the solids; then alternately withdrawing the clear liquor through said separating medium, thereby causing a coating of the suspended solids to adhere thereto, and momentarily reversing the current to throw such coating off said separating medium while still submerged.

4. The herein described process of separating liquids from solids in suspension therein, consisting in separating the suspended solids from the clear liquor while in agitation; by drawing the clear liquor through a pervious separating medium, until said medium is coated with the suspended solids; then momentarily reversing the current through the separating medium to throw off such coating; then resuming the suction until the medium is again coated; then again throwing off the coating; and alternating such suction and throwing off operations until it is desired to remove the solids.

5. The process of separating liquids from solid matters in suspension therein, consisting in immersing a separating medium pervious to the liquid and impervious to the suspended solids in a tank containing a mixture of the liquid and solids, agitating the mixture, then withdrawing, by suction, the clear liquid from the mixture through said separating medium, until a coating of the suspended solids has adhered to the said medium; then reversing the current momentarily through the medium to throw the coating off said medium while still submerged; and repeating such operations in alternation until it is desired to remove the solids; then separating the said medium from the said mixture while coated, and discharging the coating on said separating medium outside the tank.

In testimony that I claim the foregoing as my own, I affix my signature in presence of two witnesses.

JAMES MILLAR NEIL.

Witnesses:
　RUSSELL H. HAWK,
　GRACE F. NIEMANN.